Dec. 29, 1970   D. A. CARPENTER   3,550,209
APPARATUS FOR MOLDING ARTICLES
Filed Dec. 26, 1967   2 Sheets-Sheet 1
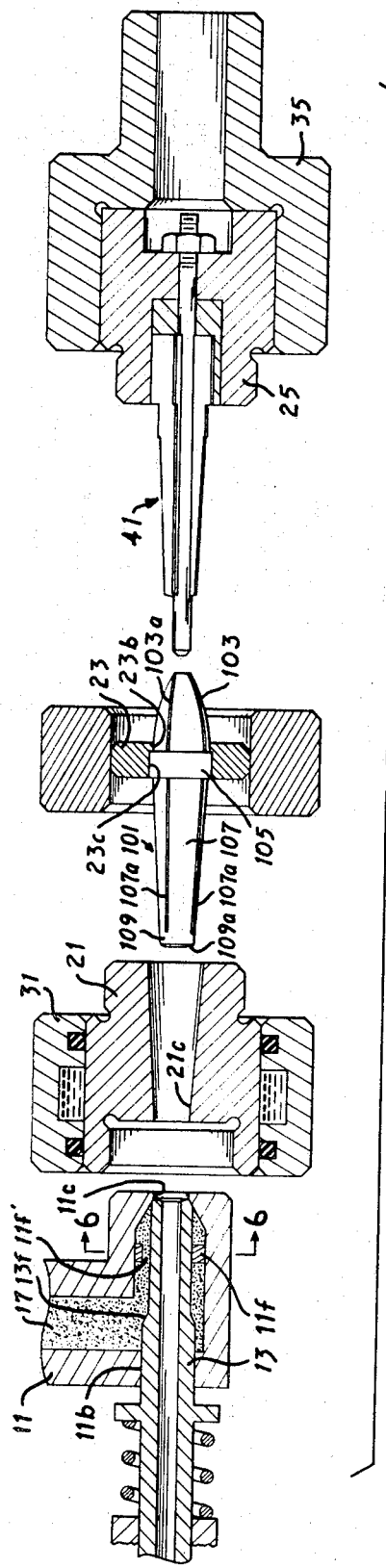
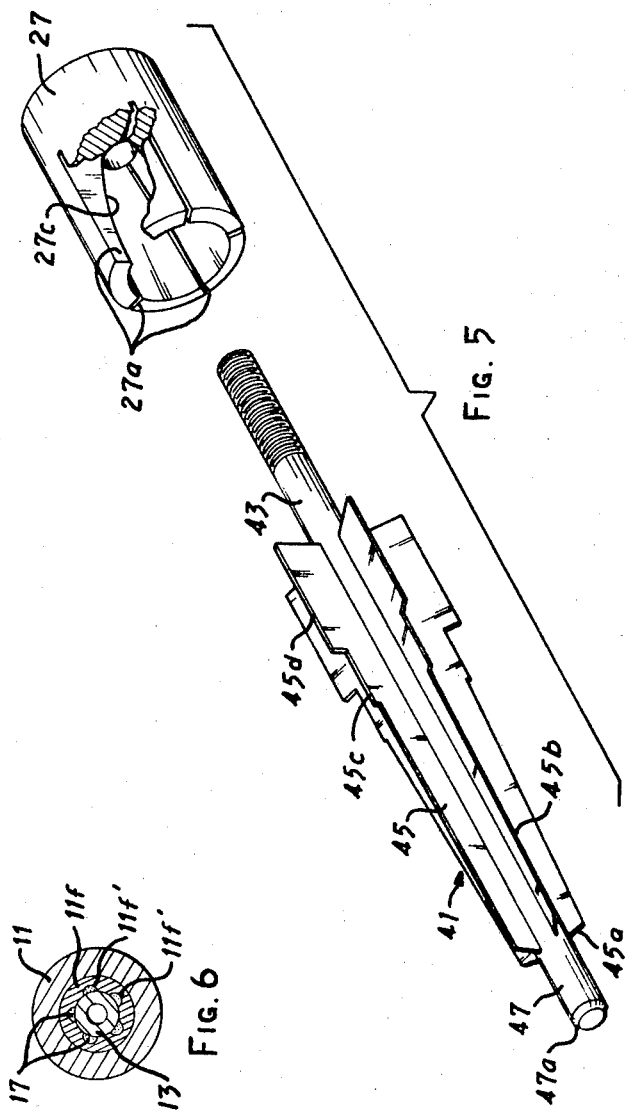
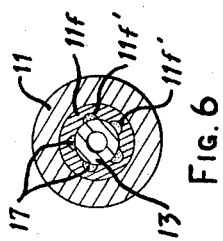
David A. Carpenter
INVENTOR
BY *[signature]*
ATTORNEY

United States Patent Office 3,550,209
Patented Dec. 29, 1970

3,550,209
APPARATUS FOR MOLDING ARTICLES
David A. Carpenter, Parkton, Md., assignor to AAI Corporation, Cockeysville, Md., a corporation of Maryland
Filed Dec. 26, 1967, Ser. No. 693,572
Int. Cl. B29c 1/00
U.S. Cl. 18—34                                      9 Claims

ABSTRACT OF THE DISCLOSURE

A molding apparatus is disclosed for molding segmented articles such as sabots, in which apparatus a core is employed having radially extending blades arranged to contact the mold cavity in various zones thereby providing for formation of open slots between segments and to be out of contact in other zones, thereby to provide for formation of annular ring sections integral with the segments of the sabot. The core has a tang engageable within a bore in a flow-control valve member coaxial with the core, the melt charge being injected into the mold cavity coaxial with the core, core tang, and core blades.

---

This invention relates to a molding apparatus and method for molding segmented sabots and other segmented articles.

It is a feature of the invention to provide a molding apparatus and method which enables formation of segmented sabots and other articles, with minimized likelihood of damage to the mold. Briefly this is effected by employing a core having radial segment-separation blades engaging the mold surface along a substantial portion of the mold length, and by feeding material into the segment zones between the blades coaxially with the core and blades, while also maintaining the core in centered position through supporting engagement of the core with a complementary end section of the feed control valve for the melt charge.

It is a further feature to provide for mutual interconnection between the segments of the sabot by formation of longitudinally spaced annular connecting rings integral with the segments. Briefly this is accomplished by spacing the blades from the cavity wall in the annular ring zone in which the integral connecting rings are desired, which in the illustrative example is at the rear end and mid-section of the sabot. The coaxial feed of melt charge into the cavity is through a substantially sprueless gate disposed at the rear end of the sabot, and the rear ring cavity wall is bounded on its rear face by the forward face of the flow-control valve.

Still other objects, features and attendant advantages will become apparent from a reading of the following detailed description of an illustrative and preferred embodiment of the invention, taken in conjunction with the accompanying drawings, wherein:

FIG. 4 is a view of the mold assembly in retracted position, after stripping of the cast sabot from the forward and rear sections of the mold, and preparatory to removal from the central or stripper mold section.

FIG. 5 is an exploded orthographic view of the core and forward or nose mold insert.

FIG. 6 is a section view taken in line 6—6 of FIG. 4.

Figure 1:
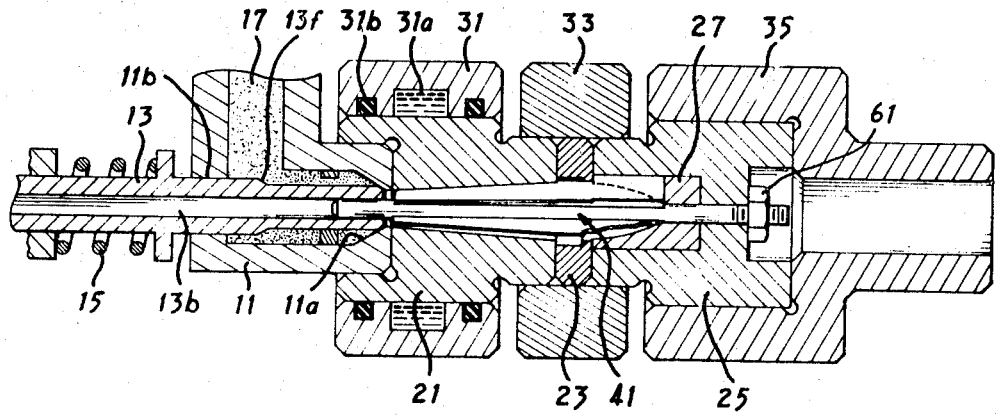
FIG. 1 is a longitudinal section view of a molding apparatus according to the invention, the core being not in section, and being shown preparatory to injection.

Referring now in detail to the figures of the drawing, in the illustrative embodiment according to the invention, a multiple part mold is provided having three separable sections formed by a rear plate 21, a central stripper plate 23, and a nose plate 25 in which is secured, as by a press fit, a nose mold plate insert 27. A cooling jacket 31 having a cooling channel 31a, for water or other desired cooling medium, is secured about the rear mold plate 21 as by a press fit, sealing being further enhanced if desired as by O-ring seals 31b. Stripper plate 23 is press fit into a carrier or support jacket 33 and nose plate 25 is likewise press fit into a support jacket 35, each of which support jackets may be suitably mounted for axial relative motion and coaxial alignment of the respective mold plate cavity sections.

A unitary sabot forming cavity is formed by the respective coaxially aligned cavity sections formed in the plates 21, 23, and 25, 27. This unitary cavity includes a tapered rear cavity wall 21c formed in rear plate 21, a ring cavity surface 23c and a reduced diameter annular stepped shoulder surface 23b formed in stripper plate 23, and an ogive shaped nose cavity wall surface 27c formed in nose plate insert 27.

A coaxial core 41 extends coaxially through the mold cavity and is supported at its opposite ends respectively by a core mounting shaft extension 43 and a core tang 47. Mounting shaft extension 43 extends through insert 27 and plate 25 and is removably secured thereto as by a nut 61 threadedly engaging therewith. Core 41 has a desired plurality of radial blades 45, in the instant example there being five blades 45, which serve to divide the sabot cavity into arcuate segments. To this end, and to aid in maintaining concentricity and uniformity of spacing of the blades 45, tapered outer face 45b of the rear section of the blades preferably contacts the complementarily tapered rear cavity wall surface 21c and the forward section of the blade likewise extends to and preferably past the ogive cavity surface 27c. To further aid in maintaining desired spacing of the blades, the forward end section 45d of the blades 45 is stepped to an enlarged parallel edged configuration which extends into complementary radial slots 27a formed in nose plate insert 27 and extending radially beyond ogive cavity surface 27c. The outer diameter of the blade step 45d may preferably be substantially the same as that of the internal diameter of the cylindrical recess 25b in plate 25, thereby affording facile and effective support, with ease of insertion and removal of the core in its mounted position.

The core tang 47 is supported at the entrance end of the cavity 41 through interengagement of the core tang 47 and reciprocably movable flow control valve rod 13 which is disposed coaxially of the core 41 and the mouth of injection feed nozzle 11. To this end, core tang 47 fits into a complementary coaxial bore 13b formed in valve rod 13, and initial entry thereinto may be facilitated by forming an annular bevel 47a on the end of tang 47.

The blades 45 terminate at their rear end in longitudinally spaced relation from the nose end 13c of valve rod 13 thereby forming a ring cavity opening 51a which serves as a ring entrance orifice and as a ring cavity section which integrally interconnects the several sabot segments formed between blades 45. This ring cavity opening 51a is bounded front and rear by valve rod nose end 13c and the transverse end faces 45a of blades 45, the nose end 13c being preferably concave or inwardly bevel surfaced and the blade rear faces 45a being sloped forwardly. The circumferential surface of the ring opening or cavity 51a is formed jointly by the tapered cavity wall 21c and an extended similarly tapered or cylindrical wall surface 11c formed forward of the concave nose end 13c of valve rod 13.

Figure 2:
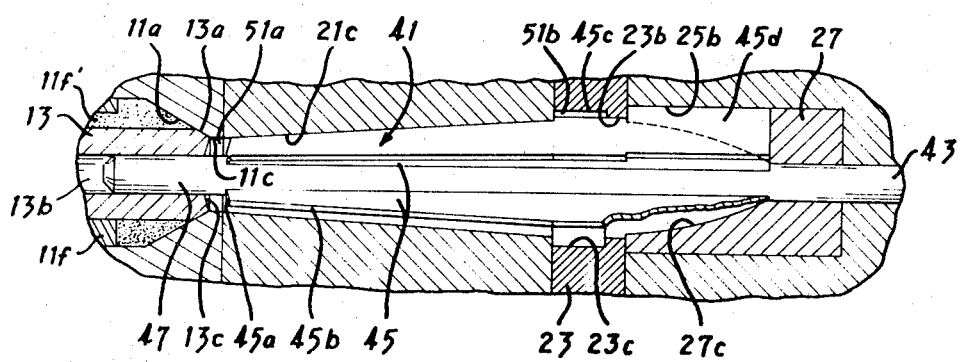
FIG. 2 is an enlarged fragmentary view of the arrangement of FIG. 1, showing the core and cavity in more detail.
Figure 3:
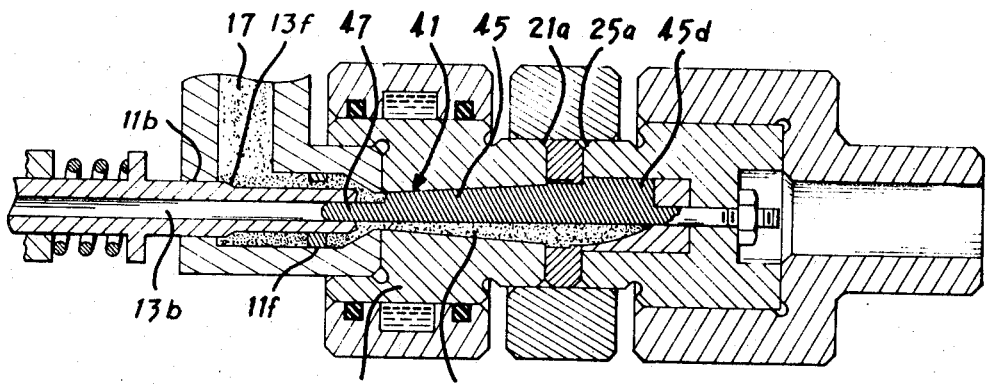
FIG. 3 is a longitudinal section view of the mold during injection.

A compression spring 15 may be suitably employed to resiliently bias the frusto-conical end 13a of valve rod 13 against complementarily tapered nozzle seat 11a at the injection mouth of the nozzle 11, and the valve rod 13 may be selectively retracted against this spring force from the seated position, as shown in FIGS. 1 and 2, to the normal flow position, as shown in FIG. 3, to enable suitably pressurized injection flow of a charge of settable liquid material 17, which may be any suitable thermoplastic melt or other desired settable liquid material, into the cavity. This retraction action may be effected either through external positive acting means, not shown, or preferably through pressure of the melt charge 17. To this end, the valve rod 13 is tapered or has a step down tapered or straight shoulder 13f formed thereon, between the rear seal zone 11b of nozzle 11 and the guide insert 11f, thereby affording a rearward force on valve rod 13 as a function of the pressure of the melt charge 17.

The forward portion of the valve rod 13 is supported during retraction by a suitable guide insert 11f press fit into the nozzle. In this connection it will, of course, be apparent that the nozzle may be constructed of multiple parts for ease of machining and assembly. Close concentricity of valve rod 13 to valve seat area must be maintained during injection to insure concentricity in the annular gate opening formed by retraction of the valve rod 13 from its mating surface at this valve mouth. Guide insert 11f has liquid flow passages 11f¹ formed about the bore thereof, as shown in FIG. 6, the number of passages preferably being the same as the number of core-blade defined cavity segments.

In operation, the valve rod 13 is retracted from the closed position (FIG. 1) to the normally open position shown in FIG. 3, and a charge of the settable liquid 17 is injected under pressure as by suitable pressurizing means such as a piston, not shown, through the nozzle 11, past valve rod 13 and coaxially into the longitudinally segmented cavity formed by cavity walls 13c, 11c, 21c, 23c, 23b and 27c. Upon filling of the cavity the valve rod 13 is moved forward to close the nozzle 11, and the charge of material in the cavity is permitted to set. The sabot casting 101 formed within the mold cavity will have a cylindrical base, a rear ring 109 and a mid-section ring 105 integrally connecting the longitudinal segments formed between longitudinal slots 107a, as shown in FIG. 4. Upon the charge of liquid cooling or otherwise setting to a solid state, the mold sections 21, 23, and 25, 27 are longitudinally separated, whereby the resulting sabot casting 109 is stripped from the forward and rear sections 21 and 25, 27 by the longitudinal motion thereof relative to the stripper plate 23 with its stepped shoulder 23b which laterally engages the mid-section ring 105 on the sabot casting. The sabot casting 109 may then be removed rearwardly from the stripper mold plate 23, whereupon the mold sections may be again closed to the position of FIG. 1, with the injection and removal cycle being thereafter repeated as desired.

In further explanation of the foregoing operation, the cooling fluid, such as water, in the cooling jacket is employed to maintain the mold temperature high enough to permit filling of the entire mold cavity, yet low enough to quickly solidify the cast sabot after injection. For example, with a melt charge of G 12/40 Nylafil glass-fiber filled nylon, a temperature range of 160° F. to 200° F. has been found satisfactory for maintaining the rear mold plate 21 in operating condition. Further, in the case of a thermoplastic material charge 17 this rear mold plate section normally must move off the nozzle 11 between cycles, as shown in FIG. 4, to enable full-remelt of the thermoplastic material 17 in the nozzle 11, preparatory to recycling. Thus, the nozzle end temperature will cycle up and down in operation, the range being for example from 300°–500° F. at the nozzle face. As the mold closes from FIG. 4 position to FIG. 1 position the cylindrical tang 47 slips into the valve rod bore 13b and maintains this bore closed during injection. It is highly desirable that injection occur substantially simultaneous with mold closure and clamping in place, in order to prevent chilled semi-set or set plastic from being formed at the nozzle and injected into the mold, as such may damage the core, in particular the blades when such are very thin as of the order of a few thousandths thickness. The valve rod may be actuated by a positive device or preferably automatically by the melt injection pressure being raised to a valve such that the rearward force acting on the differential tapered area between the diameter of the rear seal and the outer diameter of the frusto-conical valve rod end 13a, will overcome the compression spring and move the valve rod 13 rearward to open the nozzle and enable injection. After mold fill the injection pressure is then dropped and the valve spring drives the valve rod to its seated closed position. The mold is thereupon opened, as previously described, and the cycle is repeated.

While the invention has been illustrated and described with reference to a single illustrated embodiment, it will be apparent to those skilled in the art that various modifications and improvements may be made without departing from the scope and spirit of the invention. Accordingly, the invention is not to be limited by the illustrative embodiment, but only by the scope of the appended claims.

That which is claimed is:

1. Apparatus for molding sabots having a bore extending therethrough and radial slots formed therein, comprising:
   a mold unit having a cavity formed therein for receiving a charge of settable liquid material and forming a desired external sabot configuration of a charge of said material on setting of said charge to a solid state within said cavity,
   a core removably extending through the central region of said cavity and having a plurality of radially extending separator blades formed thereon,
   said blades extending radially into axially removable contact with said cavity along a substantial portion of their length to form radial slots in said sabot and to aid in self support within said cavity,
   and a gate member having a gate opening formed therein substantially coaxial with said core,
   and a valve member longitudinally slidably disposed in selective flow controlling relation in said gate opening and having a first flow-restricting longitudinal position and a second relatively open-flow longitudinal position displaced from said first longitudinal position.

2. Apparatus according to claim 1,
   said core having a core tang extending beyond said cavity,
   said valve member having a central opening formed therein removably receiving said core tang while in both said flow-restricting and said relatively open-flow positions of said valve member.

3. Apparatus for molding sabots having a bore extending therethrough and radial slots formed therein, comprising:
   a mold unit having a cavity formed therein for receiving a charge of settable liquid material and forming a desired external sabot configuration of a charge of said material on setting of said charge to a solid state within said cavity,
   a core removably extending through the central region of said cavity and having a plurality of radially extending separator blades formed thereon,
   said blades extending radially into axially removable contact with said cavity along a substantial portion of their length to form radial slots in said sabot and to aid in self support within said cavity,
   and a gate member having a gate opening formed therein substantially coaxial with said core,
   and a valve member movably disposed in selective flow control relation in said gate opening,
   said mold unit having separable forward, center and rear cavity-forming sections forming a common sabot-forming cavity, said blades extending radially into contact with said cavity along said rear cavity-forming section and said forward cavity-forming section, said blades being spaced from a portion of said center cavity-forming section to form an outer continuous connecting ring cavity zone between the forward and rear zones of said cavity.

4. Apparatus according to claim 3, said center cavity-forming section having an annular stripper shoulder defining a wall portion of its respective cavity section, said blade extending into contact with said stripper shoulder.

5. Apparatus according to claim 3, and a further rear circumferentially continuous ring cavity zone formed at said gate opening and being defined along its rear face by the forward face of said valve member.

6. Apparatus according to claim 5, said common sabot-forming cavity having a tapered forward configuration and a tapered rear configuration.

7. Apparatus according to claim 6, said tapered forward configuration being an ogive, and said tapered rear configuration being frusto-conical.

8. Apparatus according to claim 5, said further rear ring cavity zone being further defined by the respective rear faces of said blades and being continuous with the cavity zones disposed between each of said blades.

9. Apparatus according to claim 3, said forward cavity-forming section having radial slots formed therein complementary to and for receiving said blades, said blades extending radially into laterally supported engagement with said slots, said core having an extension formed thereon, and means removably securing said core to said forward core section with said blades seated in said slots.

References Cited

UNITED STATES PATENTS

| | | | |
|---|---|---|---|
| 2,301,338 | 11/1942 | Smith | 18—Core Digest |
| 2,456,423 | 12/1948 | Jobst | 64—304 |
| 2,471,148 | 5/1949 | Gale et al. | 18—30WI |
| 3,109,201 | 11/1963 | Dulmage | 18—30WCX |

J. SPENCER OVERHOLSER, Primary Examiner

M. O. SUTTON, Assistant Examiner

U.S. Cl. X.R.

18—30